Feb. 16, 1960     B. SEAMAN     2,925,112

AUTOMOTIVE TIRE CONSTRUCTION

Filed July 14, 1958

INVENTOR.
BERNARD SEAMAN

BY Hann and Nydick

ATTORNEYS

United States Patent Office 2,925,112
Patented Feb. 16, 1960

2,925,112

AUTOMOTIVE TIRE CONSTRUCTION

Bernard Seaman, Tarrytown, N.Y.

Application July 14, 1958, Serial No. 748,482

3 Claims. (Cl. 152—211)

The present invention relates to inflatable tires for automotive vehicles such as passenger vehicles and trucks, and more particularly to an automotive tire construction for use in snow, sand and mud or on ice.

There are on the market special tires with various tread paterns all designed to increase the grip of the tire on the road or other surface and also accomplishing this purpose more or less well. However, such so-called snow tires, once mounted must be continuously used. As is well known, snow tires tend to be noisier than normal tread tires and give less mileage due to the increased contact with the road or other surface.

There are also known special normal tread tires in which are incorporated road gripping members such as cleats, lugs or blunt spikes. Those elements are normally retracted from contact with the road or other surface, but can be caused to protrude beyond the normal treaded running surface of the tire and into gripping engagement with the road or other surface. The protruding members have a gripping action very similar to a snow chain and, as is generally accepted, the gripping action of snow chains is markedly superior to that of the best snow tires now known.

However the disadvantage of tires with built-in retractable gripping members as heretofore known, is that they rely for protrusion of the gripping members upon the availability of an external force especially the inflation of air chambers in the tires. More often than not, a driver will find himself in a location such as his own driveway or the open road where pressure air for inflating the air chambers is not available, and the action of the gripping members is most needed.

Accordingly, it is an object of the invention to provide a novel and improved automotive tire construction which affords the advantage that a normal tread tire can be converted into a tire with a snow-chain like gripping action without the need of using pressure air or another external force.

Another object of the invention is to provide a novel and improved tire construction with built-in gripping members which for use of the tire under normal road conditions are retracted from contact with the road surface but can be brought into action in a very simple manner and without the use of special equipment or pressure air.

It is still another object of the invention to provide a novel and improved tire construction with built-in gripping members which can be moved from an inactive retracted position into a protruding active position by the simple expedient of partly deflating the tire and which can be returned into the retracted position clear of the road or other surface by restoring the tire to normal pressure.

Other and further objects, features and advantages of the invention will be pointed out hereinafter and set forth in the appended claims forming part of the invention.

In the accompanying drawing a preferred embodiment of the invention is shown by way of illustration and not by way of limitation.

Figure 1:
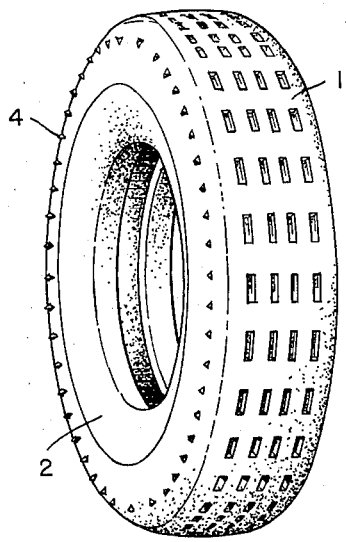
Fig. 1 is a perspective view of a tire construction according to the invention.

Referring now to the figures in detail, the tire shown in Fig. 1 is basically a conventional tire. It has a treaded running surface 1 and side walls 2. The pattern of the tire treads is not essential for the invention. Any of the numerous known tire tread patterns is suitable. It is also irrelevant for the invention whether the tire is a so-called tubeless tire or a tire in which an inner tube is fitted.

The term "normal tire pressure" which is used herein is not intended to define any specific air pressure, but a tire pressure substantially within the range prescribed for the specific tire by the manufacture, or in other words the tire pressure at which the tire is considered as normally inflated for operation. As is well known, the prescribed tire pressure varies greatly for different types of tires.

According to the invention, a plurality of gripping members 4 are fixedly inserted circumferentially spaced in at least one of the side walls of the tire, preferably in both side walls. The gripping members are preferably but not necessarily uniformly distributed. They may be made of metal such as steel or a suitable wear resistant hard composition. They may have any suitable shape, preferably they are in the form of cleats, knobs or blunted spikes as is shown in Figs. 3 and 4.

Figure 2:
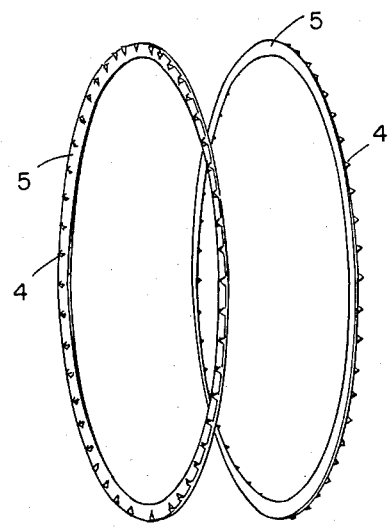
Fig. 2 is a perspective view of the road gripping members and the mounting means therefor.

The gripping members may be individually embedded in the side walls simultaneously with the molding of the tire, but for manufacturing convenience, it is preferable to mount the gripping members on a circular ribbon or band 5 as shown in Fig. 2. These bands with the cleats 4 attached thereto may then be inserted directly in the tire mold so that they become an integral part of the tire construction. As can best be seen in Figs. 3 and 4 the ribbon rings 5 are disposed in the tire material which joins the side walls 2 to the running surface 1 proper, or in other words closely adjacent to the peripheral circumference of the running surface.

Figure 3:
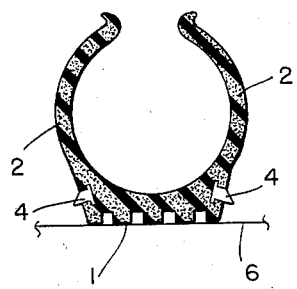
Fig. 3 is a cross section of a normally inflated tire.
Figure 4:
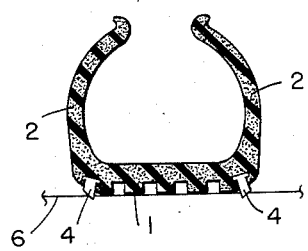
Fig. 4 is a cross section of the same tire partly deflated.

Fig. 3 shows the cross sectional configuration of the tire at normal tire pressure. The cleats 4 protrude from the side walls but are clear of the surface 6 upon which the tire rests. As a result, the cleats do not affect in any way the normal function of the tire. They do not cause any noise and they are also not subject to wear and tear. When it is desired to bring the cleats into action the tire is partially deflated by reducing the air pressure to the desired extent. This can be effected by the driver without the need of special tools or skill by simply opening the tire valve for an appropriate period of time. Due to the partial flattening of the tire, the marginal side wall portion descends sufficiently to bring the cleats into gripping engagement with the road or other surface 6. At the same time, the cleats are compelled to turn somewhat so that the pointed edges of the cleats face the road. To return the cleats from the active position of Fig. 4 into the position retracted relative to the road of Fig. 3 it is merely necessary to reinflate the tire to the normal pressure whereby it will automatically reassume the cross sectional configuration of Fig. 3. Such reinflation can be accomplished when the road gripping action of the cleats is no longer necessary and the driver reaches a service station.

While the invention has been described in detail with respect to a certain now preferred example and embodiment of the invention it will be understood by those skilled in the art after understanding the invention, that various changes and modifications may be made without departing from the spirit and scope of this invention, and it is intended, therefore, to cover all such changes and modifications in the appended claims.

What is claimed as new and desired to be secured by Letters Patent is:

1. An inflatable tire construction for automotive vehicles, said tire construction comprising a tire casing having a running surface and side walls extending therefrom, a ring, and a plurality of cleats made of rigid wear resistant material, each of said cleats being secured on one end to said ring, the free end of each cleat constituting a road gripping portion, said cleats being disposed in circumferential spacing and extending approximately parallel to the geometric axis of the ring, said ring being embedded in the respective side wall of the tire with the road gripping portions of the cleats protruding therefrom substantially at a right angle, the protruding cleat portions being located along a circumference in a side wall portion located above the running surface at substantial normal tire pressure but flexible to descend for broadening the running surface upon reduction of the tire pressure below a predetermined pressure, said road gripping cleat portions descending jointly with said wall portion into a position protruding outwardly from the broadened running surface, whereby the protruding cleat portions are in gripping engagement with a surface upon which the running surface of the tire rests.

2. A tire construction according to claim 1 wherein said cleats are made of wear resistant metal.

3. A tire construction according to claim 1 wherein said cleats are made of wear resistant hard composition material.

References Cited in the file of this patent

UNITED STATES PATENTS

| | | |
|---|---|---|
| 1,371,501 | McLane | Mar. 15, 1921 |
| 2,235,375 | Kraft | Mar. 18, 1941 |
| 2,354,715 | Tarbox | Aug. 1, 1944 |
| 2,819,750 | Langdon | Jan. 14, 1958 |